United States Patent
Onishi (10) Patent No.: US 7,721,597 B2
(45) Date of Patent: May 25, 2010

(54) SIMPLIFIED ANEMOSCOPE

(76) Inventor: Yuji Onishi, 6-4-21, Nakagaito, Daito-shi, Osaka (JP) 574-0013

( * ) Notice: Subject to any disclaimer, the term of this patent is extended or adjusted under 35 U.S.C. 154(b) by 64 days.

(21) Appl. No.: 12/081,555

(22) Filed: Apr. 17, 2008

(65) Prior Publication Data

US 2009/0217751 A1  Sep. 3, 2009

(30) Foreign Application Priority Data

Feb. 28, 2008  (JP) .............................. 2008-048320

(51) Int. Cl.
*G01P 13/00* (2006.01)
(52) U.S. Cl. .................................. 73/170.01
(58) Field of Classification Search ........................ None
See application file for complete search history.

(56) References Cited

U.S. PATENT DOCUMENTS

| | | | |
|---|---|---|---|
| 3,678,746 | A | 7/1972 | Corey |
| 5,186,118 | A | 2/1993 | Stinson |
| 7,140,245 | B2 * | 11/2006 | Thomas .................... 73/170.01 |
| D546,693 | S | 7/2007 | Okin et al. |

FOREIGN PATENT DOCUMENTS

| | | |
|---|---|---|
| DE | 199 11 583 | 9/2000 |
| GB | 2 421 283 | 6/2006 |
| JP | 60-132768 U | 9/1985 |
| JP | 62-173062 U | 11/1987 |
| JP | 63-181851 U | 11/1988 |
| JP | 5-2838 Y2 | 1/1993 |
| JP | 7-14379 U | 3/1995 |
| JP | 1275834 S | 7/2006 |
| JP | 3126997 U | 11/2006 |
| JP | 4146508 B1 | 9/2008 |
| JP | 1347088 S | 12/2008 |
| JP | 4229396 B1 | 2/2009 |

OTHER PUBLICATIONS

U.S. Patent Application of Onishi, filed as U.S. Appl. No. 29/336,852 May 11, 2009.
DM/067340, Feb. 28, 2006.
United Kingdom Search Report in Application No. GB0807470.0 dated Aug. 11, 2008.
Notification of Reason(s) for Refusal in JP 2008-130810 dated Sep. 12, 2008, and English Translation thereof.

\* cited by examiner

*Primary Examiner*—Lisa M Caputo
*Assistant Examiner*—Jermaine Jenkins
(74) *Attorney, Agent, or Firm*—Buchanan Ingersoll & Rooney PC (57) ABSTRACT

The present invention provides a simplified anemoscope that allows the direction and intensity of the wind to be relatively accurately confirmed in a simple manner, and that is superior in portability and design. A simplified anemoscope according to the present invention allows the direction and/or intensity of the wind to be confirmed by squirting out a powder or liquid material. The simplified anemoscope includes: a hollow section loaded with the powder or liquid material, and having at least one pore sized to allow the powder or liquid material to be squirted out; and a push-out section for pushing out the air in the hollow section.

23 Claims, 9 Drawing Sheets

SIMPLIFIED ANEMOSCOPE

BACKGROUND OF THE INVENTION

1. Field of the Invention

The present invention relates to anemoscopes that allow the direction and intensity of the wind to be confirmed in a simple manner, and more particularly to a simplified anemoscope suitable for mobile use.

2. Description of the Background Art

Conventionally, in order to confirm the direction and intensity of the wind while playing golf, grass is torn up and tossed in the air. However, grass is not light enough to satisfactorily fly in the wind, and therefore the direction and intensity of the wind cannot be accurately confirmed by merely tearing up and tossing grass in the air. Under such circumstances, the following patent documents have been disclosed.

Japanese Laid-Open Utility Model Publication No. 60-132768 discloses a device for confirming the wind direction by a light ribbon attached at the end of a golf club grip.

Japanese Registered Utility Model No. 3126997 discloses a device for confirming the wind direction by the direction of a flag provided in an air passage.

Japanese Laid-Open Utility Model Publication No. 7-14379 discloses a device for confirming the wind direction by discharging cigarette smoke.

However, the device described in Japanese Laid-Open Utility Model Publication No. 60-132768 is less than attractive in appearance, and is also hard to use from the perspective of golfers. In particular, when swinging the golf club, it is necessary to remove the ribbon, which is troublesome.

The device described in Japanese Registered Utility Model No. 3126997 has a complicated structure, and is unlikely to be provided at low cost. In addition, it is inferior in portability and design.

The device described in Japanese Laid-Open Utility Model Publication No. 7-14379 is not particularly useful for golfers who do not have any habit of smoking. In addition, it is inferior in portability and design.

SUMMARY OF THE INVENTION

Therefore, an objective of the present invention is to provide a simplified anemoscope that allows the direction and intensity of the wind to be relatively accurately confirmed in a simple manner, and that is superior in portability and design.

To attain the above objective, the present invention has the following features. The present invention is directed to a simplified anemoscope for confirming the direction and/or intensity of the wind by squirting out a powder or liquid material, the anemoscope comprising: a hollow section loaded with the powder or liquid material and having at least one pore sized to allow the powder or liquid material to be squirted out; and a push-out section for pushing out the air in the hollow section.

Preferably, the push-out section may be provided at an outer surface of the hollow section, and may be formed of a flexible material.

Preferably, the hollow section may be roughly ellipsoidal when viewed two-dimensionally, and the push-out section may have an elongated shape, the size of a thumbtip or fingertip.

Preferably, the hollow section may have an elongated hole provided in a position in which to dispose the flexible material for forming the push-out section, the elongated hole being smaller than the flexible material, and the flexible material may be fixed around the periphery of the elongated hole from inside the hollow section.

Preferably, the hollow section may include: an inlet/outlet port for taking out/loading the powder or liquid material; and a lid for closing the inlet/outlet port.

Preferably, the hollow section may have an elongated shape when viewed two-dimensionally.

Preferably, the hollow section may be tapered toward the pore.

Preferably, the hollow section may include a portion recessed in the shape of a golf accessory, and the golf accessory may be attached to the recessed portion.

Preferably, the recessed portion may have a part that corresponds to an edge of the golf accessory and is recessed deeper than other parts.

Preferably, a cap for closing the pore may be further comprised.

Preferably, at least a part of the hollow section may be flexible, and the flexible part may also serve as the push-out section.

According to the present invention, by pressing the push-out section, the powder or liquid material loaded in the hollow section is squirted out of the pore. Thus, it is possible to confirm the direction and intensity of the wind by observing the flow and speed of the powder or liquid material squirted out in the form of a mist. The powder or liquid material in the form of a mist is extremely light, and therefore it is possible to relatively accurately confirm the direction and intensity of the wind compared to the case of tearing up and tossing grass in the air, for example. The simplified anemoscope of the present invention has an extremely simplified configuration, and is compact and light-weighted, and therefore it is superior in portability. In addition, because of the simplified configuration, various designs can be employed. Thus, it is possible to provide various simplified anemoscopes superior in design.

By providing the push-out section at the outer surface of the hollow section, it is possible to enhance the integrity of the hollow section and the push-out section, thereby improving user-friendliness, along with portability and design. In addition, the powder or liquid material can be smoothly squirted out if the hollow section has a roughly oval shape when viewed two-dimensionally, and the push-out section has an elongated shape, the size of a thumbtip or fingertip.

By fixing the flexible material from inside the hollow section, it becomes possible to prevent the powder or liquid material loaded in the hollow section from leaking out. In addition, by allowing the powder or liquid material to be taken out/loaded by opening the lid, it becomes possible to reuse the simplified anemoscope of the present invention.

By providing the hollow section in an elongated shape, it becomes possible to effectively deliver the powder or liquid material loaded in the hollow section toward the pore. In addition, even if the hollow section has a shape tapered toward the pore, it is still possible to effectively deliver the powder or liquid material toward the pore. Thus, the powder or liquid material can be efficiently squirted out.

By attaching the golf accessory to the hollow section, it becomes possible to enhance user convenience. In addition, by deepening a part of the recessed portion, it becomes possible to facilitate easy detachment of the golf accessory.

The cap with the pore prevents the powder or liquid material from being squirted out by mistake. If the cap is coupled to the simplified anemoscope, it is possible to prevent it from being lost.

By rendering a portion of the hollow section flexible, such that the flexible portion also serves as a push-out section, the structure of the simplified anemoscope is further simplified, thereby further improving portability and design.

These and other objectives, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
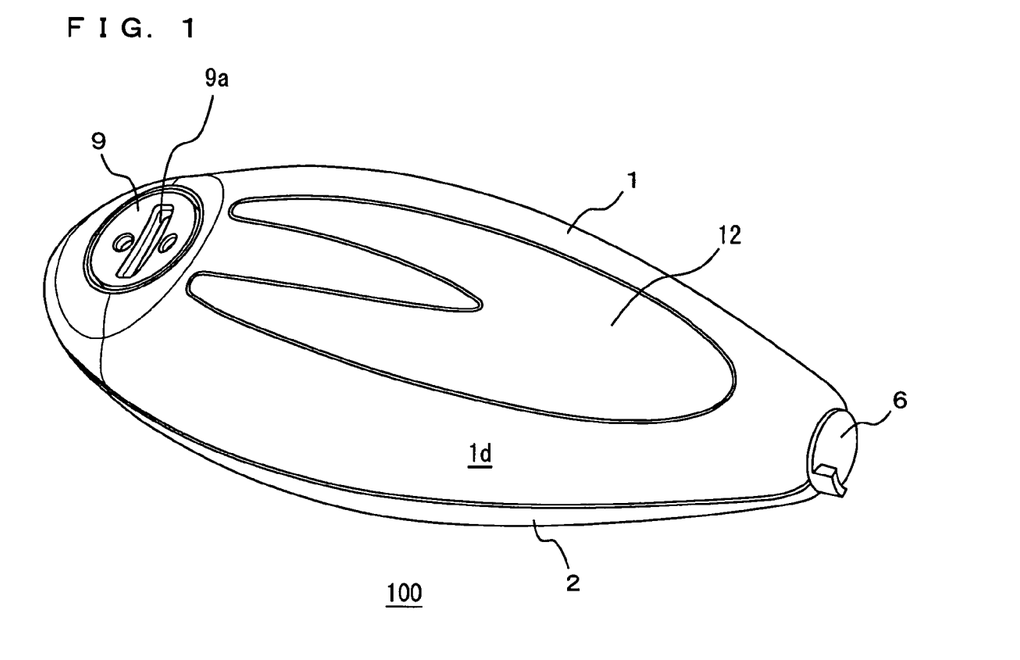
FIG. 1 is a perspective view as seen from the front side of a simplified anemoscope 100 according to a first embodiment of the present invention.
Figure 2:
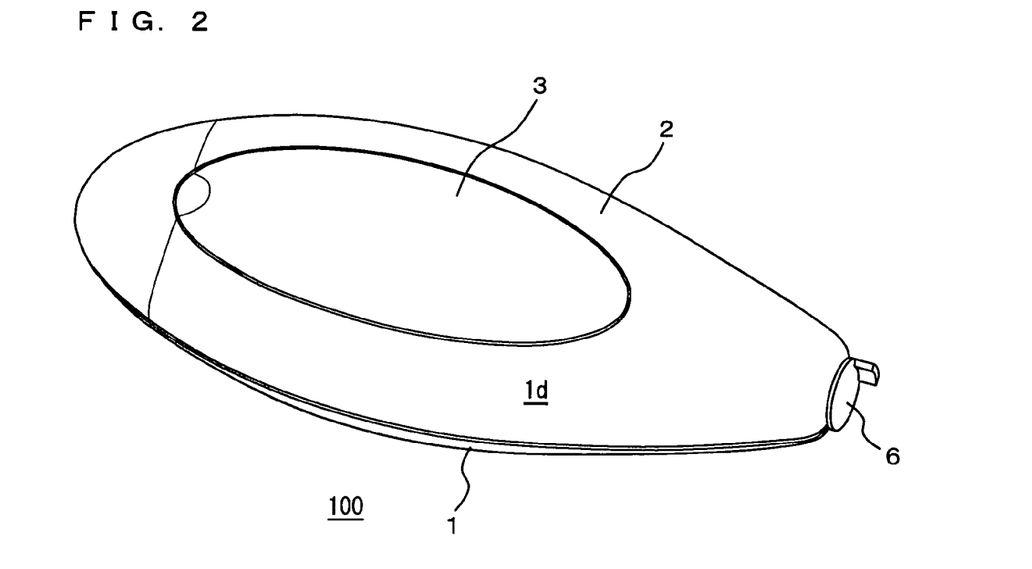
FIG. 2 is a perspective view as seen from the back side of the simplified anemoscope 100.
Figure 3:
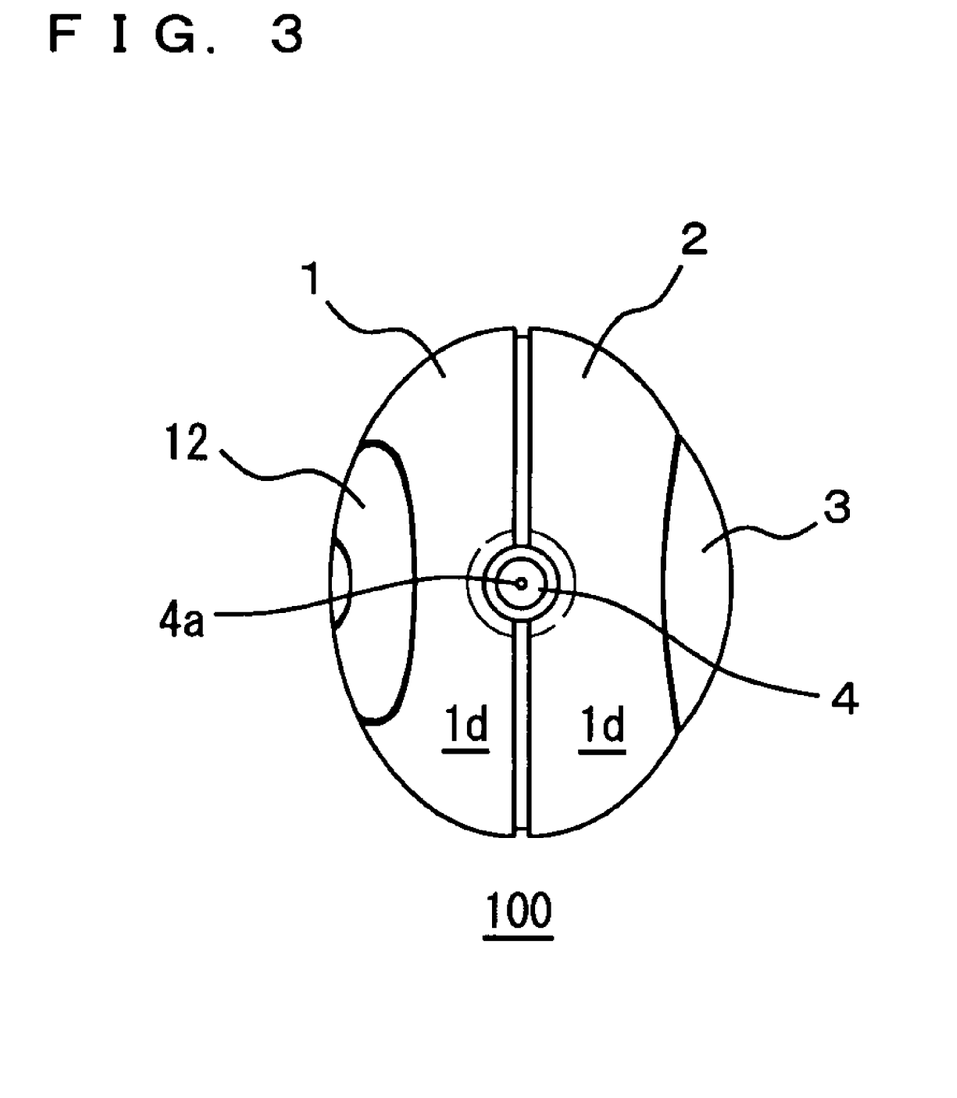
FIG. 3 is a right-side view of the simplified anemoscope 100.

FIG. 1 is a perspective view as seen from the front side of a simplified anemoscope 100 according to a first embodiment of the present invention. FIG. 2 is a perspective view as seen from the back side of the simplified anemoscope 100. FIG. 3 is a right-side view of the simplified anemoscope 100. The simplified anemoscope 100 is a device that allows the direction and/or intensity of the wind to be confirmed by squirting out a powder or liquid material. The simplified anemoscope 100 includes a hollow section $1d$ formed by fitting an upper hollow section 1 and a lower hollow section 2 together, and a push-out section 3 provided at an outer surface of the hollow section $1d$. The hollow section $1d$ has a pore $4a$ sized to allow the powder or liquid material to be squirted out. The hollow section $1d$ has a roughly oval shape when viewed two-dimensionally and it is tapered toward the pore $4a$. The push-out section 3 has an elongated shape, the size of a thumbtip or fingertip.

By opening a lid 9, it becomes possible to load the hollow section of the simplified anemoscope 100 with a powder material, such as lime (a powder of calcium oxide, calcium hydrate, calcium carbonate, calcium, or the like), plaster (a powder of calcium sulfate or suchlike), flour, powdered starch, soybean flour, powdered arrowroot, rice flour, or buckwheat flour, or a liquid material, such as water or colored water. The push-out section 3 is formed of a flexible material, such as rubber or flexible plastic, which can be deflected by mere pressure with a thumb or finger. By pressing the push-out section 3, the air in the hollow section $1d$ can be pushed out of the pore $4a$. Accordingly, when the hollow section $1d$ is loaded with a powder or liquid material, the powder or liquid material is squirted out of the pore $4a$.

Figure 4:
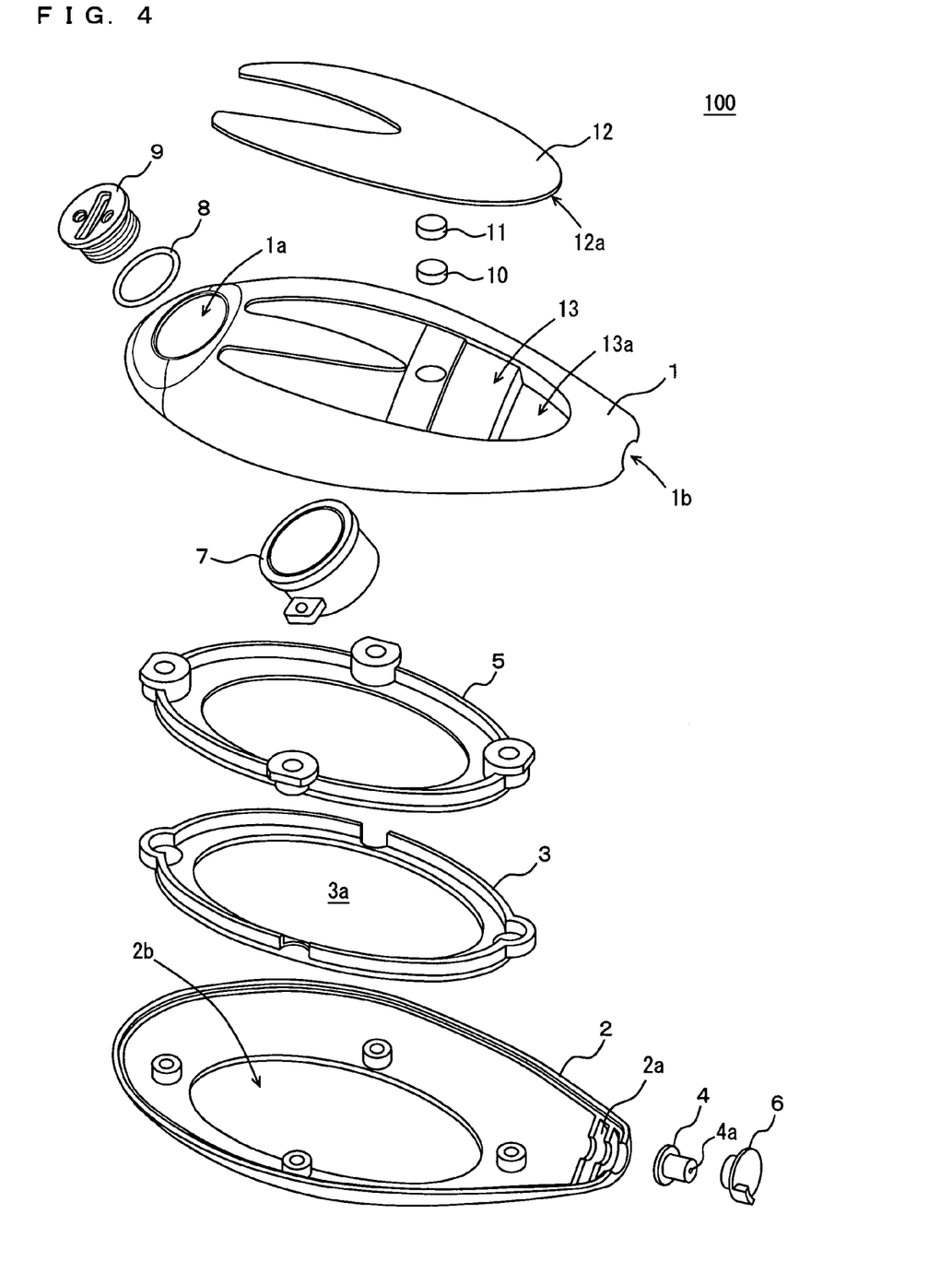
FIG. 4 is an exploded perspective view of the simplified anemoscope 100.
Figure 5:
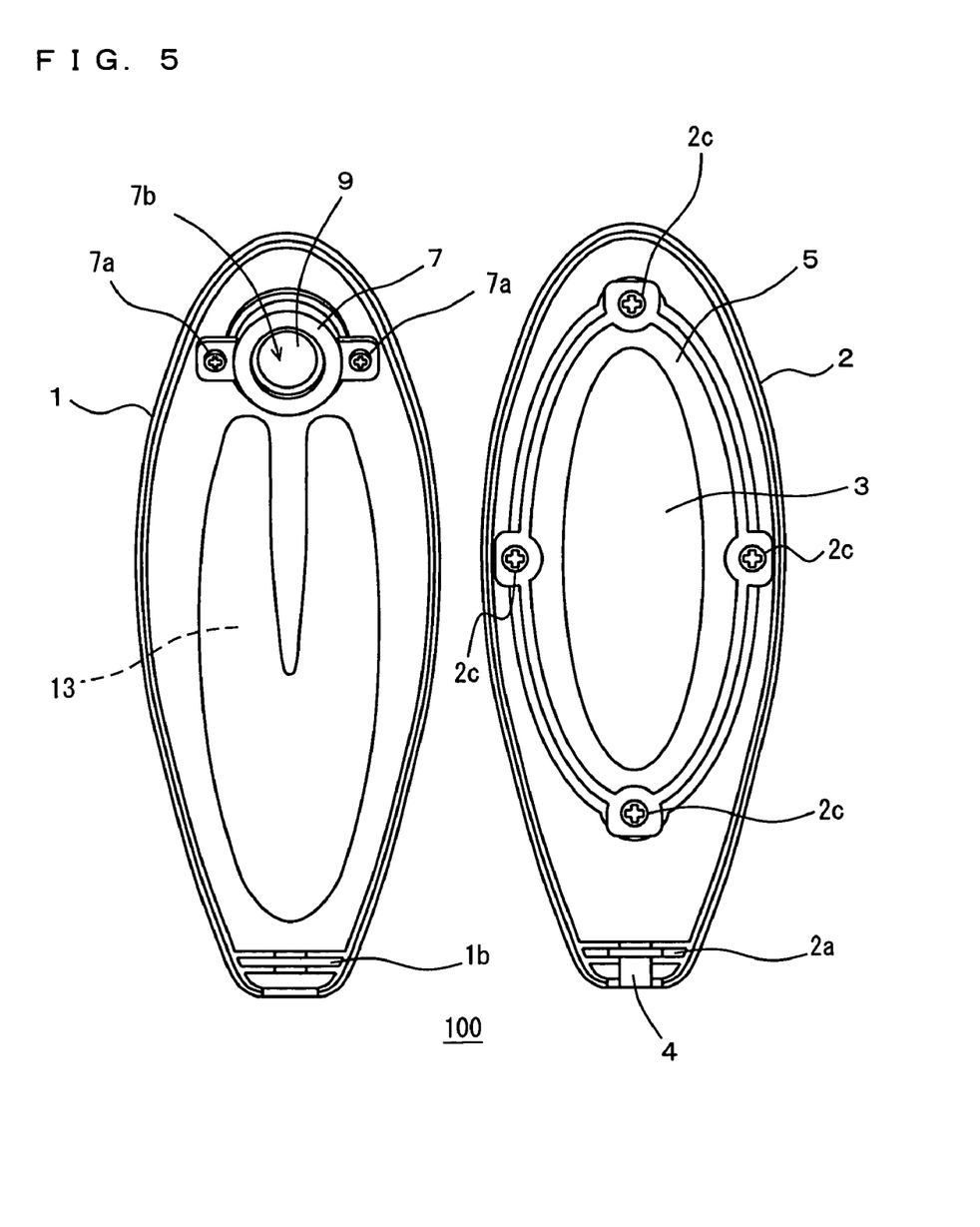
FIG. 5 is a view illustrating the internal structure of the simplified anemoscope 100.

FIG. 4 is an exploded perspective view of the simplified anemoscope 100. FIG. 5 is a view illustrating the internal structure of the simplified anemoscope 100. The detailed structure of the simplified anemoscope 100 will be described with reference to FIGS. 4 and 5.

The simplified anemoscope 100 includes the upper hollow section 1, the lower hollow section 2, the push-out section 3, a pore section 4, an attaching member 5, a cap 6, an inlet/outlet forming member 7, an O-ring 8, the lid 9, magnets 10 and 11, and a green fork 12. Each element is formed by resin molding, for example.

Figure 6:
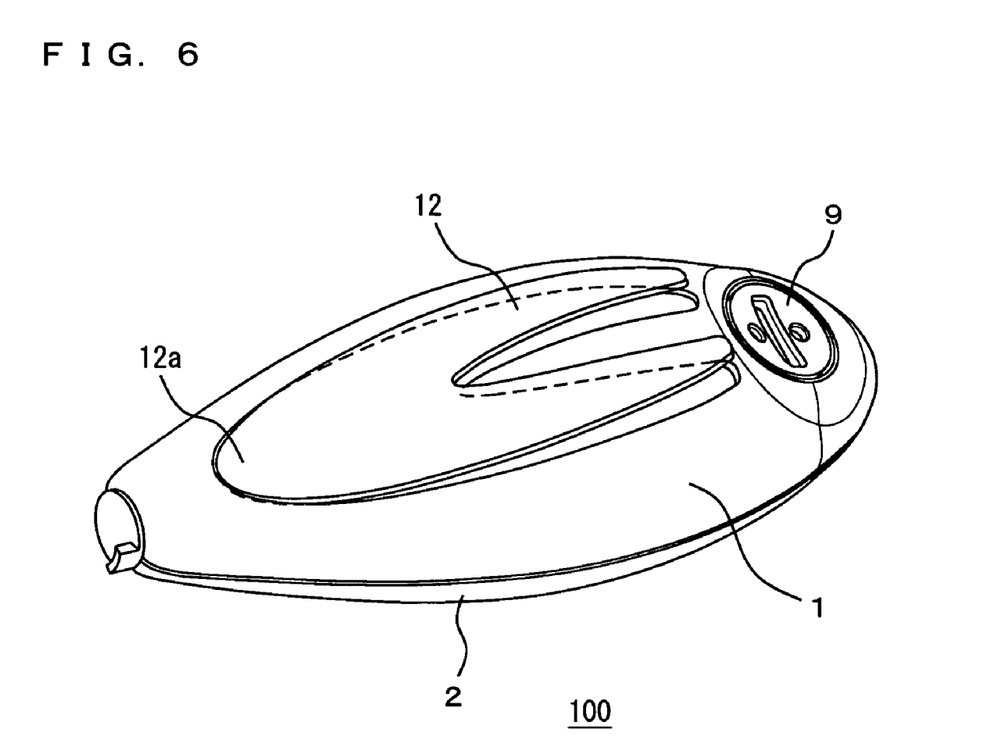
FIG. 6 is a view illustrating a green fork 12 being lifted.

The upper hollow section 1 includes a recessed portion 13 having the shape of the green fork 12. The recessed portion 13 has a recess in which to embed the magnet 10. The magnet 10 is embedded in that recess. The green fork 12 has a recess in which to embed the magnet 11 at its bottom surface. The magnet 11 is embedded in that recess. The position in which the magnet 10 is embedded corresponds to the position in which the magnet 11 is embedded. When the green fork 12 is fitted in the recessed portion 13, the magnets 10 and 11 attract each other, thereby detachably securing the green fork 12. Furthermore, the recessed portion 13 has a part $13a$, which corresponds to an end $12a$ of the green fork 12 and is recessed deeper than other parts. Accordingly, by depressing the end $12a$ into the part $13a$, the end that is opposite to the end $12a$ is lifted from the recessed portion 13. FIG. 6 is a view illustrating the green fork 12 being lifted. By lifting the opposite end as described above, the green fork 12 can be readily detached.

The upper hollow section 1 includes a through-hole $1a$ having an inner diameter roughly equivalent to the outer diameter of the inlet/outlet forming member 7. The inlet/outlet forming member 7 is inserted into the through-hole $1a$ from inside the upper hollow section 1. The inlet/outlet forming member 7 is fixed with screws $7a$ from inside the upper hollow section 1, as shown in FIG. 5. The inlet/outlet forming member 7 has an inlet/outlet port $7b$ passing therethrough. The inlet/outlet port $7b$ is an inlet/outlet for loading the powder or liquid material. The inlet/outlet port $7b$ is threaded inside. The lid 9 has a roughly cylindrical shape that is threaded to accord with the thread in the inlet/outlet port $7b$. The O-ring 8 has an internal diameter roughly equivalent to the outer diameter of the lid 9. The O-ring 8 is fitted on the lid 9. The lid 9 having the O-ring 8 fitted thereon is screwed into the inlet/outlet port $7b$. Thus, the powder or liquid material is prevented from leaking out. The lid 9 includes an opening/closing groove $9a$, as shown in FIG. 1. The opening/closing groove $9a$ has a width of about the thickness of a coin, and facilitates easy opening/closing of the lid.

The upper hollow section 1 and the lower hollow section 2 respectively include grooves $1b$ and $2a$ for engaging with the pore section 4 having a T-like shape. The cap 6 closes the pore $4a$ in the pore section 4. The lower hollow section 2 has an elongated hole $2b$ sized to allow the push-out section 3, which bulges at the bottom surface, to project its bottom bulge $3a$. The elongated hole $2b$ is a through-hole smaller than the push-out section 3. The push-out section 3 disposed in the elongated hole $2b$ of the lower hollow section 2 is attached to the lower hollow section 2 with a plurality of screws $2c$ via the attaching member 5, as shown in FIG. 5. Specifically, the push-out section 3 is fixed around the periphery of the elongated hole 2b from inside the hollow section 1d.

The upper hollow section 1 and the lower hollow section 2 are joined together by a plurality of latches (omitted in the figure) projecting slightly higher than the outer circumference of the lower hollow section 2 and latching on the inner rim of the lower hollow section 1. As a result, the hollow section 1d is formed. Any well-known means can be used as the latching means. Alternatively, the upper hollow section 1 and the lower hollow section 2 may be attached with an adhesive.

Figure 7:
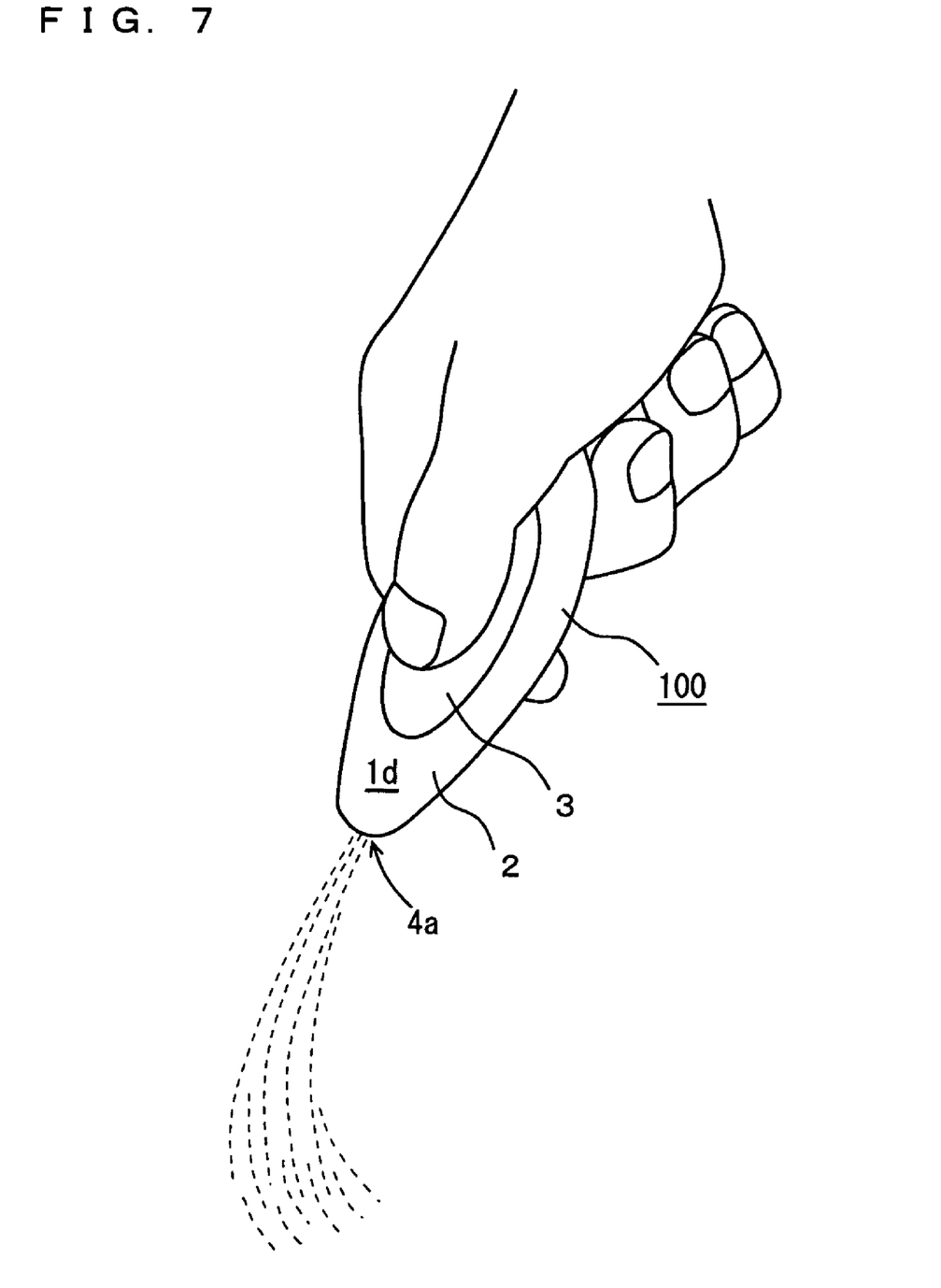
FIG. 7 is a diagram illustrating an exemplary usage of the simplified anemoscope 100.

FIG. 7 is a diagram illustrating an exemplary usage of the simplified anemoscope 100. By pressing the push-out section 3 with, for example, a thumbtip or fingertip, the powder or liquid material loaded in the hollow section 1d is squirted out of the pore 4a in the form of a mist, as shown in FIG. 7. By observing the direction in which the mist flows, it is possible to confirm the wind direction. In addition, by observing the speed of the mist flow, it is possible to confirm the wind intensity. The faster the mist flows, the greater the wind intensity is. Note that in the case where the liquid material is loaded, it is easier to squirt out a mist if the pore 4a is smaller than in the case where the powder material is loaded. In addition, there is another usage in which the simplified anemoscope 100 is lightly shaken before use in order to disperse the powder or liquid material, and then the push-out section 3 is pressed to squirt out the powder or liquid material. Moreover, the powder or liquid material may be squirted out with the pore 4a pointing downward, or they may be squirted out toward any suitable direction, such as upward, rightward, leftward, forward, or backward.

In the first embodiment, the simplified anemoscope 100 is used to allow the direction and/or intensity of the wind to be confirmed in a simple manner as described above. The simplified anemoscope 100 has a streamlined shape and is compact enough to be held in a palm, and therefore it can be readily stored in a pocket, a bag, or the like. Thus, the simplified anemoscope 100 superior in portability and design is provided. In addition, the push-out section 3 is provided at the outer surface of the hollow section 1d, and therefore the integrity of the push-out section 3 and the hollow section 1d is enhanced, thereby improving portability and design, along with user-friendliness. The present inventor has conducted various studies, finding that the powder or liquid material can be smoothly squirted out when the hollow section 1d has a roughly oval shape when viewed two-dimensionally, and the push-out section 3 has an elongated shape, the size of a thumbtip or fingertip. By fixing the push-out section 3 from inside the hollow section 1d, it becomes possible to prevent the powder or liquid material loaded in the hollow section 1d from leaking out. By allowing the powder or liquid material to be taken out/loaded by opening the lid 9, it becomes possible to reuse the simplified anemoscope of the present invention.

Note that even if a part of the recessed portion 13 that corresponds to the end of the green fork 12 that is opposite to the end 12a is recessed deeper than other parts, the green fork 12 can be readily detached.

Second Embodiment

Figure 8:
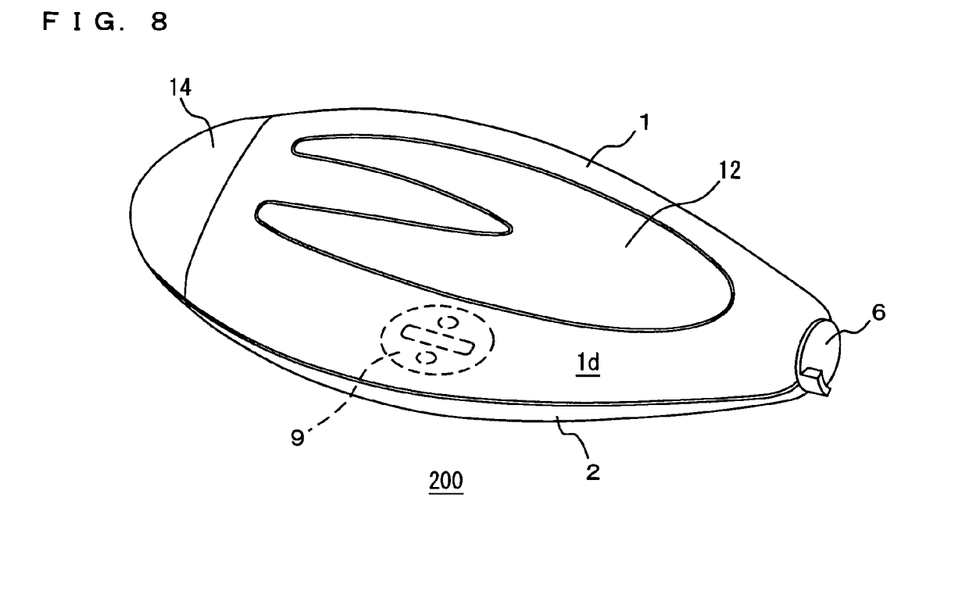
FIG. 8 is a perspective view of a simplified anemoscope 200 according to a second embodiment of the present invention.

FIG. 8 is a perspective view of a simplified anemoscope 200 according to a second embodiment of the present invention. In FIG. 8, elements having similar functions as in the first embodiment are denoted by the same reference numerals. The simplified anemoscope 200 differs in the position of the push-out section 14 from its counterpart in the first embodiment. The push-out section 14 has a roughly semicircular shape, and is provided at the end that is opposite to the pore section 4. Here, the push-out section 14 is fixed from inside the upper hollow section 1, but it may be fixed from inside the lower hollow section 2. In addition, the push-out section 14 may be fixed to both the upper hollow section 1 and the lower hollow section 2. By pressing the push-out section 14 with, for example, a thumbtip or fingertip, the air in the hollow section 1d is pushed out, thereby squirting out a powder or liquid-material from the pore 4a.

As shown in the second embodiment, in the present invention, the position of the push-out section is not particularly limited. The powder or liquid material can be squirted out so long as the push-out section formed of a flexible material is provided at a portion of the outer surface of the hollow section.

Third Embodiment

Figure 9:
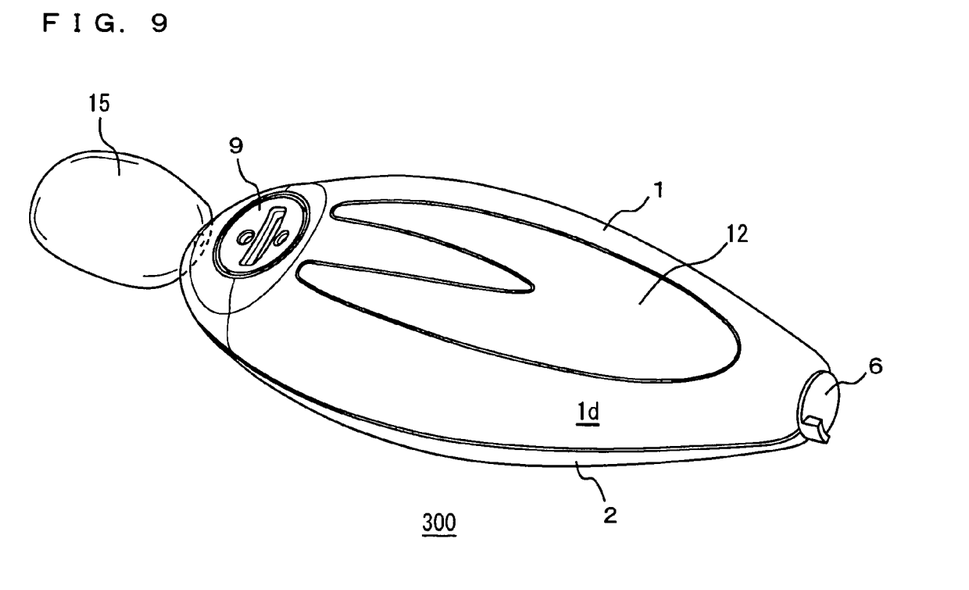
FIG. 9 is a perspective view of a simplified anemoscope 300 according to a third embodiment of the present invention.

FIG. 9 is a perspective view of a simplified anemoscope 300 according to a third embodiment of the present invention. In FIG. 9, elements having similar functions as in the first embodiment are denoted by the same reference numerals. The simplified anemoscope 300 differs in the position of the push-out section 15 from its counterpart in the first embodiment. In the third embodiment, the push-out section is not provided at the outer surface of the hollow section 1d. The push-out section 15 is provided independently of the hollow section 1d so as to communicate with the hollow section 1d. All or part of the push-out section 15 is formed of a flexible material. By pressing the push-out section 15, the air in the push-out section 15 is forced into the hollow section 1d, so that the air in the hollow section 1d is pushed out.

As shown in the third embodiment, in the present invention, the push-out section is not limited to being formed at the outer surface of the hollow section. The push-out section can take any form or structure so long as it is an element having the function of pushing out the air in the hollow section.

Fourth Embodiment

Figure 10:
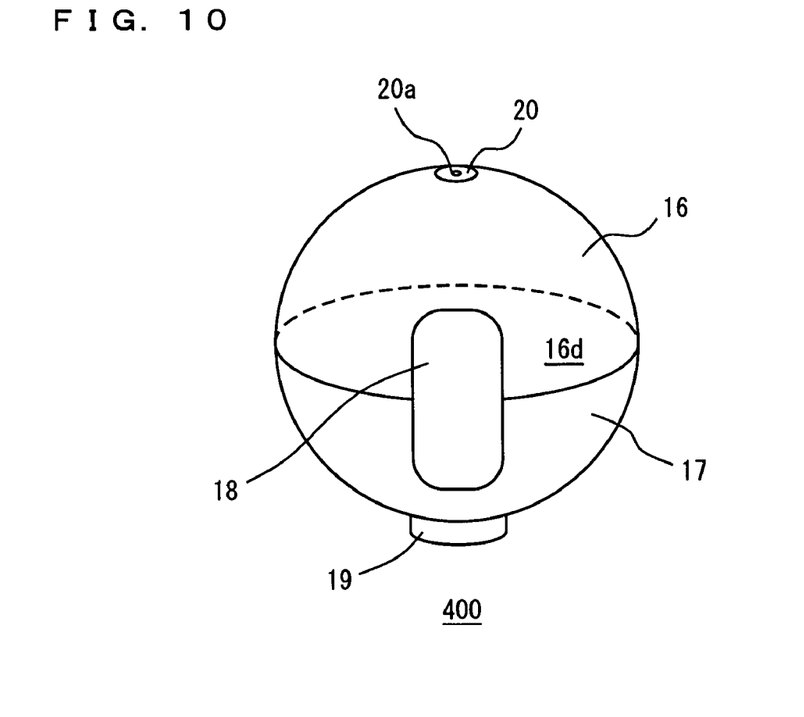
FIG. 10 is a perspective view of a simplified anemoscope 400 according to a fourth embodiment of the present invention.

FIG. 10 is a perspective view of a simplified anemoscope 400 according to a fourth embodiment of the present invention. In FIG. 10, the simplified anemoscope 400 includes an upper hollow section 16, a lower hollow section 17, a push-out section 18, a lid 19, and a pore section 20. The upper hollow section 16 and the lower hollow section 17 are joined together to form a hollow section 16a. The push-out section 18 is fixed from inside the upper hollow section 16 and the lower hollow section 17. The push-out section 18 is formed of a flexible material. Note that the push-out section 18 may be provided in either the upper hollow section 16 or the lower hollow section 17. By opening the lid 19, a powder or liquid material can be taken out of/loaded into an inlet/outlet port at the bottom of the hollow section 16a. By pressing the push-out section 18 with, for example, a thumbtip or fingertip, the air in the hollow section 16a is pushed out, thereby squirting out the powder or liquid material from a pore 20a.

As shown in the fourth embodiment, in the present invention, the shape of the hollow section when viewed two-dimensionally is not limited to a roughly elongated oval shape so long as the hollow section is loaded with the powder or liquid material and has a pore sized to allow the powder or liquid material to be squirted out.

Fifth Embodiment

Figure 11:
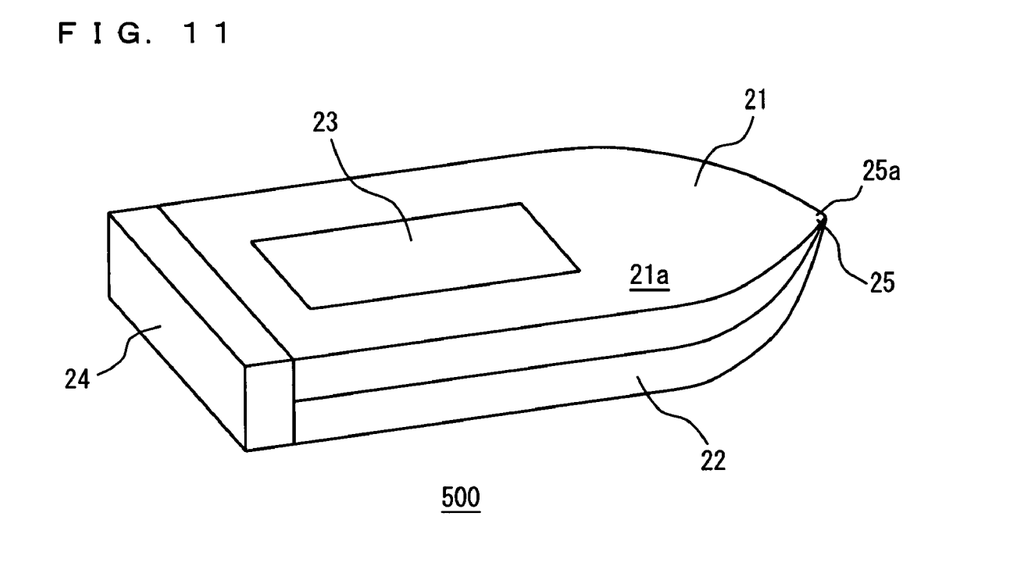
FIG. 11 is a perspective view of a simplified anemoscope 500 according to a fifth embodiment of the present invention.

FIG. 11 is a perspective view of a simplified anemoscope 500 according to a fifth embodiment of the present invention.

In FIG. 11, the simplified anemoscope 500 includes an upper hollow section 21, a lower hollow section 22, a push-out section 23, a lid 24, and a pore section 25. The upper hollow section 21 and the lower hollow section 22 are joined together to form a hollow section 21a. The push-out section 23 has an elongated shape, the size of a thumbtip or fingertip, and it is fixed from inside the upper hollow section 21. The push-out section 23 is formed of a flexible material. Note that the push-out section 23 may also be provided in the lower hollow section 22. The lid 24 is a cap-like lid that can be fitted on an opening end (an inlet/outlet port) of the hollow section 21a. By detaching the lid 24, a powder or liquid material can be taken out/loaded. By pressing the push-out section 23 with, for example, a thumbtip or fingertip, the air in the hollow section 21a is pushed out, thereby squirting out the powder or liquid material from a pore 25a.

As shown in the fifth embodiment, in the present invention, the shape of the hollow section when viewed two-dimensionally is not limited to a roughly elongated oval shape so long as the hollow section is loaded with the powder or liquid material and has a pore sized to allow the powder or liquid material to be squirted out. However, in order to efficiently squirt out the powder or liquid material, the hollow section preferably has an elongated shape when viewed two-dimensionally. In addition, even if the hollow section does not have an elongated shape when viewed two-dimensionally, at least it preferably has a shape tapered toward the pore. This also allows the powder or liquid material to be efficiently squirted out.

Sixth Embodiment

Figure 12:
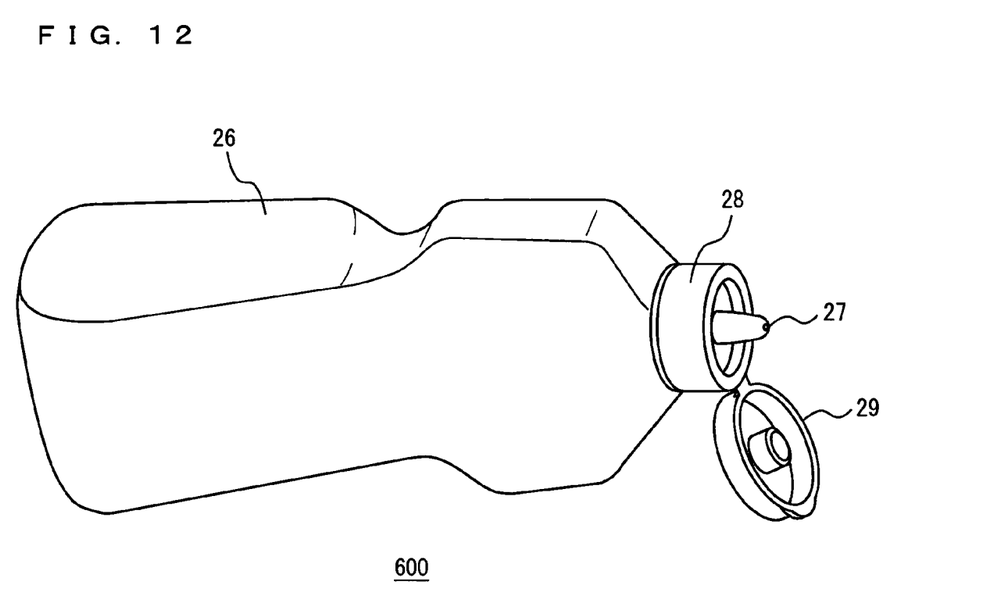
FIG. 12 is a simplified anemoscope 600 according to a sixth embodiment of the present invention.

FIG. 12 is a simplified anemoscope 600 according to a sixth embodiment of the present invention. In FIG. 12, the simplified anemoscope 600 includes a hollow section 26 with a lid 28, along with a pore 27 and a cap 29. The lid 28 closes an inlet/outlet port (not visibly recognizable in the figure) provided at the right end of the hollow section 26, and it includes the pore 27 and the cap 29. The lid 28 is considered to be a part of the hollow section 26. By putting on the cap 29, the pore 27 can be closed. The hollow section 26 is formed of a flexible material, such as flexible plastic, excepting the lid 28. By pressing the body of the hollow section 26, the hollow section 26 is deflected, so that the internal air is pushed out from the pore 27. That is, the hollow section 26 also serves as a push-out section. Therefore, even with such a structure as the simplified anemoscope 600, it is possible to squirt out a powder or liquid material to confirm the direction and intensity of the wind. Note that any portions other than the lid 28 have been described here as being formed of a flexible material, but only a part of the hollow section 26 may be flexible so long as the flexible part functions as a push-out section.

As shown in the sixth embodiment, in the present invention, at least a part of the hollow section may be flexible so that the flexible portion also functions as a push-out section. In addition, as shown in the sixth embodiment, the lid 28 for closing the inlet/outlet port from which to take out/load the powder or liquid material constitutes a part of the hollow section 26, and therefore the pore 27 may be provided in the lid 28. That is, in the present invention, the hollow section can broadly encompass any element that is loaded with a powder or liquid material and has a pore.

(Other Variants)

The simplified anemoscope of the present invention can be used for any purposes other than golf. For example, it can be used for any competitive sports or events that require simple recognition of the direction and intensity of the wind, such as kiteflying, archery, baseball, soccer, volleyball, tennis, badminton, dodgeball, cricket, basketball, rugby, American football, handball, water polo, hockey, gateball, climbing, and athletic meets.

Although the simplified anemoscope of the present invention can be used for squirting out a liquid material, squirting out a powder material renders it easier to confirm the direction and intensity of an extremely light wind flow. Note that the powder material is not limited to any particular type.

The powder or liquid material is not necessarily taken out/loaded, and a disposable simplified anemoscope having no lid but being preloaded with the powder or liquid material may be used.

The push-out section is not limited in number, and a plurality of push-out sections may be provided. In addition, one or more pores may be provided so long as the hollow section has at least one pore.

The cap for closing the pore may be coupled to a part of the simplified anemoscope in order to prevent it from being lost.

Note that the green fork is embedded in the hollow section in the first embodiment, but a golf accessory, such as a tee or a marker, may be embedded along with the green fork. In such a case, the hollow section may include a portion recessed in the shape of the golf accessory. Also, in order to facilitate easy detachment, the recessed portion may have a part that corresponds to an edge of the golf accessory and is formed deeper than other parts. A plurality of such golf accessories may be attached.

Note that the above-described method of assembling the simplified anemoscope is merely illustrative, and should not be construed to be restrictive.

In addition, the above-described shapes and structures are merely illustrative. For example, when viewed two-dimensionally or three-dimensionally, the hollow section may take any geometric shape, such as a rough circle, a rough triangle, a rough square, a rough rectangle, a rough trapezoid, a rough parallelogram, a rough cylindrical column, a rough quadrangular prism, a rough polygonal column, a rough circular cone, a rough square pyramid, a rough polygonal pyramid, a rough circular truncated cone, a rough semicircle, or a rough hemisphere. In addition, the hollow section may be shaped to mimic any natural object, such as a certain animal, person, or plant. Furthermore, the hollow section may be shaped to mimic any artifact, such as a cartoon character, a vehicle, an electronic product, or a stationery product. In this manner, the shape of the hollow section is not intended to limit the present invention in any way. In addition, when viewed two-dimensionally or three-dimensionally, the push-out section may take any geometric shape, such as a rough circle, a rough triangle, a rough square, a rough rectangle, a rough trapezoid, a rough parallelogram, a rough cylindrical column, a rough quadrangular prism, a rough polygonal column, a rough circular cone, a rough square pyramid, a rough polygonal pyramid, a rough circular truncated cone, a rough semicircle, or a rough hemisphere. In addition, the push-out section may be shaped to mimic any natural object, such as a certain animal, person, or plant. Furthermore, the push-out section may be shaped to mimic any artifact, such as a cartoon character, a vehicle, an electronic product, or a stationery product.

The present invention provides a simplified anemoscope superior in portability and design, which is industrially useful.

While the invention has been described in detail, the foregoing description is in all aspects illustrative and not restrictive. It is understood that numerous other modifications and variations can be devised without departing from the scope of the invention.

What is claimed is:

1. A simplified golf anemoscope for confirming, while playing golf, the direction and/or intensity of the wind by squirting out a powder or liquid material, the anemoscope comprising:
 a hollow section loaded with the powder or liquid material and having at least one pore sized to allow the powder or liquid material to be squirted out; and
 a push-out section for pushing out the air in the hollow section;
 wherein the simplified golf anemoscope is smaller than a palm of a hand.

2. The simplified golf anemoscope according to claim 1, wherein at least a part of the hollow main body section is flexible, and the flexible part also serves as the depressible push-in section.

3. A method for evaluating the direction, intensity, or both, of wind conditions at a golf course, comprising squirting out a powder or liquid material from the golf anemoscope of claim 1.

4. A simplified golf anemoscope for confirming, while playing golf, the direction and/or intensity of the wind by squirting out a powder or liquid material, the anemoscope comprising:
 a hollow main body section including a space loaded with the powder or liquid material and having at least one opening sized to allow the powder or liquid material to be squirted out; and
 the hollow main body section including a depressible push-in section for compressing the space in the hollow section,
 wherein the depressible push-in section is formed of a flexible material fixed around the periphery of a hole provided in the hollow main body section.

5. The simplified golf anemoscope according to claim 4, wherein the flexible material is fixed around the periphery of the hole from inside the hollow main body section.

6. The simplified golf anemoscope according to claim 4,
 wherein the hollow main body section is roughly ellipsoidal when viewed two-dimensionally, and
 wherein the depressible push-in section has an elongated shape, the size of a thumbtip or fingertip.

7. The simplified golf anemoscope according to claim 4,
 wherein the hole provided in the hollow main body section is elongate and is smaller than the flexible material for forming the depressible push-in section, and
 wherein the flexible material is fixed around the periphery of the elongated hole from inside the hollow main body section.

8. The simplified golf anemoscope according to claim 7,
 wherein the hollow main body section is roughly ellipsoidal when viewed two-dimensionally, and
 wherein the depressible push-in section has an elongated shape, the size of a thumbtip or fingertip.

9. The simplified golf anemoscope according to claim 4, wherein the hollow main body section includes:
 an inlet/outlet port for taking out/loading the powder or liquid material; and
 a lid for closing the inlet/outlet port.

10. The simplified golf anemoscope according to claim 4, wherein the hollow main body section has an elongated shape when viewed two-dimensionally.

11. The simplified anemoscope according to claim 4, wherein the hollow main body section is tapered to the one opening.

12. The simplified golf anemoscope according to claim 4,
 wherein the hollow main body section includes a portion recessed in the shape of a golf accessory, and
 wherein the golf accessory is attached by magnetic attraction to the recessed portion.

13. The simplified golf anemoscope according to claim 12, wherein the recessed portion has a part that corresponds to an edge of the golf accessory and is recessed deeper than other parts.

14. The simplified golf anemoscope according to claim 4, further comprising a cap for closing the one opening.

15. A method for confirming, while playing golf, the direction and/or intensity of the wind, comprising squirting out a powder or liquid material in a hollow anemoscope the anemoscope comprising: a hollow section loaded with the powder or liquid material and having at least one port sized to allow the powder or liquid material to be squirted out; and a push-out section for pushing out the air in the hollow section; wherein the simplified golf anemoscope is smaller than a palm of a hand.

16. The method according to claim 15, wherein the wind is blowing over a golf course.

17. A simplified golf anemoscope for confirming, while playing golf, the direction and/or intensity of the wind by squirting out a powder or liquid material, the anemoscope comprising:
 a hollow main body section having a space loaded with the powder or liquid material and having at least one opening sized to allow the powder or liquid material to be squirted out; and
 a depressible push-in section for compressing the space in the hollow section,
 wherein the hollow main body section is roughly ellipsoidal when viewed two-dimensionally.

18. The simplified golf anemoscope according to claim 17, wherein the depressible push-in section has an elongated shape, the size of a thumbtip or fingertip.

19. A simplified golf anemoscope for confirming, while playing golf, the direction and/or intensity of the wind by squirting out a powder or liquid material, the anemoscope comprising:
 a hollow main body section having a space loaded with the powder or liquid material; and
 the hollow main body section further including an inlet/outlet port and a lid for closing the inlet/outlet port,
 wherein the lid includes:
 at least one opening sized to allow the powder or liquid material to be squirted out; and
 a cap for closing the opening,
 wherein the cap is attached to the lid by turning, and
 wherein the powder or liquid material is squirted out from the opening by pressing the hollow main body section.

20. The simplified golf anemoscope according to claim 19, wherein the hollow main body section is roughly ellipsoidal when viewed two-dimensionally.

21. The simplified golf anemoscope according to claim 20, wherein the hollow main body section has a depressible push-in section that has an elongated shape, the size of a thumbtip or fingertip.

22. A simplified golf anemoscope for confirming, while playing golf, the direction and/or intensity of the wind by squirting out a powder or liquid material, the anemoscope comprising:
 a hollow main body section including a space loaded with the powder or liquid material and having at least one opening sized to allow the powder or liquid material to be squirted out; and the hollow main body section including a depressible push-in section for compressing the space in the hollow section, wherein the depressible push-in section is formed of a flexible material fixed around the periphery of a hole being spaced from the opening in the hollow main body section.

23. A simplified golf anemoscope for confirming, while playing golf, the direction and/or intensity of the wind by squirting out a powder or liquid material, the anemoscope comprising:
- a hollow main body section including a space loaded with the powder or liquid material and having at least one opening sized to allow the powder or liquid material to be squirted out; and
- the hollow main body section including a depressible push-in section for compressing the space in the hollow section,
- wherein the hollow main body section is formed into any one of:
  - a rough circle (when viewed two-dimensionally),
  - a rough triangle (when viewed two-dimensionally),
  - a rough trapezoid (when viewed two-dimensionally),
  - a rough semicircle (when viewed two-dimensionally),
  - a rough parallelogram (when viewed two-dimensionally, excluding a rough square and a rough rectangle),
  - a rough cylindrical column,
  - a rough polygonal column (excluding a rough quadrangular prism),
  - a rough circular cone,
  - a rough square pyramid,
  - a rough polygonal pyramid,
  - a rough circular truncated cone,
  - a rough hemisphere,
  - a shape mimicking an animal,
  - a shape mimicking a person,
  - a shape mimicking a plant,
  - a shape mimicking a natural object,
  - a shape mimicking a cartoon character,
  - a shape mimicking a vehicle,
  - a shape mimicking an electronic product, or
  - a shape mimicking a stationery product wherein the simplified golf anemoscope is smaller than a palm of a hand.

* * * * *